US010878799B2

(12) United States Patent
Saito et al.

(10) Patent No.: US 10,878,799 B2
(45) Date of Patent: Dec. 29, 2020

(54) INFORMATION PRESENTING APPARATUS AND INFORMATION PRESENTING METHOD

(71) Applicant: SONY CORPORATION, Tokyo (JP)

(72) Inventors: Mari Saito, Kanagawa (JP); Hiro Iwase, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 16/310,633

(22) PCT Filed: Aug. 15, 2017

(86) PCT No.: PCT/JP2017/029341
§ 371 (c)(1),
(2) Date: Dec. 17, 2018

(87) PCT Pub. No.: WO2018/043112
PCT Pub. Date: Mar. 8, 2018

(65) Prior Publication Data
US 2019/0180733 A1 Jun. 13, 2019

(30) Foreign Application Priority Data

Aug. 29, 2016 (JP) ................................ 2016-166783

(51) Int. Cl.
*G06F 17/27* (2006.01)
*G10L 19/00* (2013.01)
(Continued)

(52) U.S. Cl.
CPC ............ *G10L 13/00* (2013.01); *G06F 3/0481* (2013.01); *G06F 3/16* (2013.01); *G06F 3/167* (2013.01); *G10L 13/08* (2013.01)

(58) Field of Classification Search
CPC .......... G06F 3/0481; G06F 3/16; G06F 3/167; G10L 13/043; G10L 13/08
(Continued)

(56) References Cited

U.S. PATENT DOCUMENTS 5,358,259 A * 10/1994 Best ...................... A63F 13/005
463/31
6,356,837 B1 * 3/2002 Yokota ................... G01C 21/34
701/411
(Continued)

FOREIGN PATENT DOCUMENTS

WO WO 2016/070354 A1 5/2016

OTHER PUBLICATIONS

Jul. 8, 2019, European Search Report issued for related EP Application No. 17846120.8.

*Primary Examiner* — Khai N. Nguyen
(74) *Attorney, Agent, or Firm* — Paratas Law Group, PLLC

(57) ABSTRACT

There is provided an information presenting apparatus to make it easy for the user to understand presentation information that is output as a voice. The information presenting apparatus includes an acquirer that acquires presentation information to be presented to a user, a generator that generates support information to be presented, together with the presentation information, to the user, based on the acquired presentation information, and synthesizes a voice that corresponds to the generated support information, and a presenter that presents the synthesized voice that corresponds to the support information, as an utterance of a first agent. The present technology is applicable to a robot, a signage apparatus, a car navigation apparatus, a watch-over system, a moving-image reproduction apparatus, or the like, for example.

15 Claims, 17 Drawing Sheets

(51) Int. Cl.
*G10L 21/00* (2013.01)
*G10L 13/00* (2006.01)
*G06F 3/16* (2006.01)
*G06F 3/0481* (2013.01)
*G10L 13/08* (2013.01)

(58) Field of Classification Search
USPC .................................. 704/200, 258, 272
See application file for complete search history.

(56) References Cited

U.S. PATENT DOCUMENTS

| | | | |
|---|---|---|---|
| 7,867,086 B2* | 1/2011 | Sitrick | H04N 5/272 463/31 |
| 9,898,849 B2* | 2/2018 | Du | G10L 25/48 |
| 2003/0163320 A1* | 8/2003 | Yamazaki | G10L 13/033 704/270 |
| 2004/0054519 A1* | 3/2004 | Kobayashi | G10L 13/06 704/1 |
| 2007/0218987 A1* | 9/2007 | Van Luchene | A63F 13/12 463/30 |
| 2008/0086236 A1* | 4/2008 | Saito | G06N 3/008 700/245 |
| 2010/0028846 A1* | 2/2010 | Cohen | G09B 17/006 434/323 |
| 2014/0136207 A1* | 5/2014 | Kayama | G10H 1/344 704/258 |
| 2015/0094851 A1* | 4/2015 | Kawabe | B25J 11/0005 700/246 |
| 2016/0216941 A1* | 7/2016 | Ramseur | G06F 3/167 |
| 2016/0300379 A1* | 10/2016 | Du | G06K 9/00248 |
| 2017/0053642 A1* | 2/2017 | Yamamoto | G10L 13/033 |
| 2019/0180733 A1* | 6/2019 | Saito | G06F 3/167 |

\* cited by examiner

FIG.16
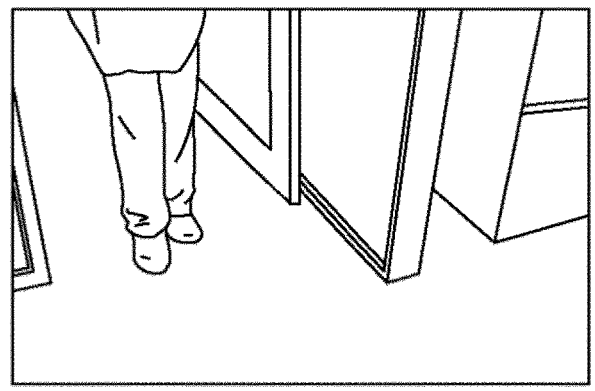
(RECORDING OF NUMBER OF ENTRIES AND EXITS)
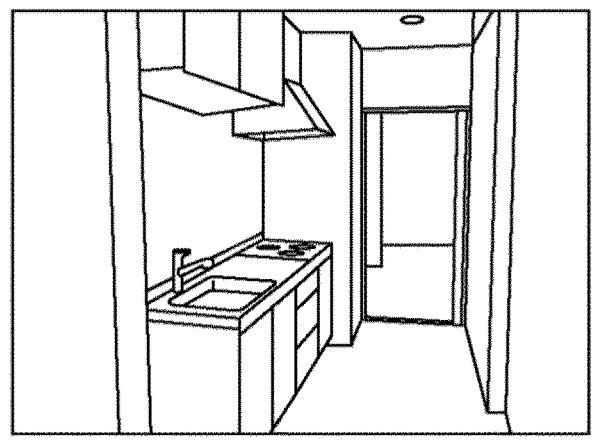
(RECORDING OF COOKING TIME ZONE)
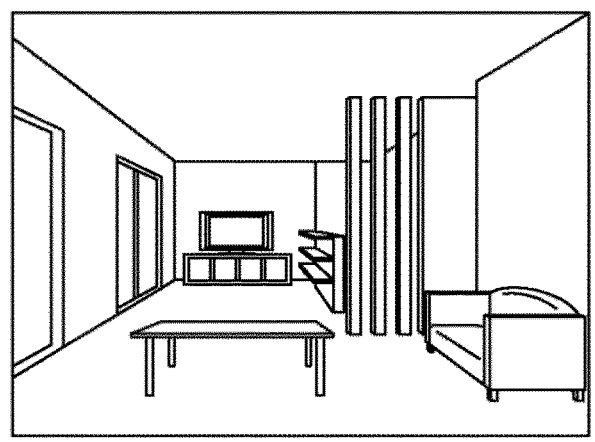
(MONITORING FOR DANGER)
(RECORDING OF TIME STAYED ON SOFA)

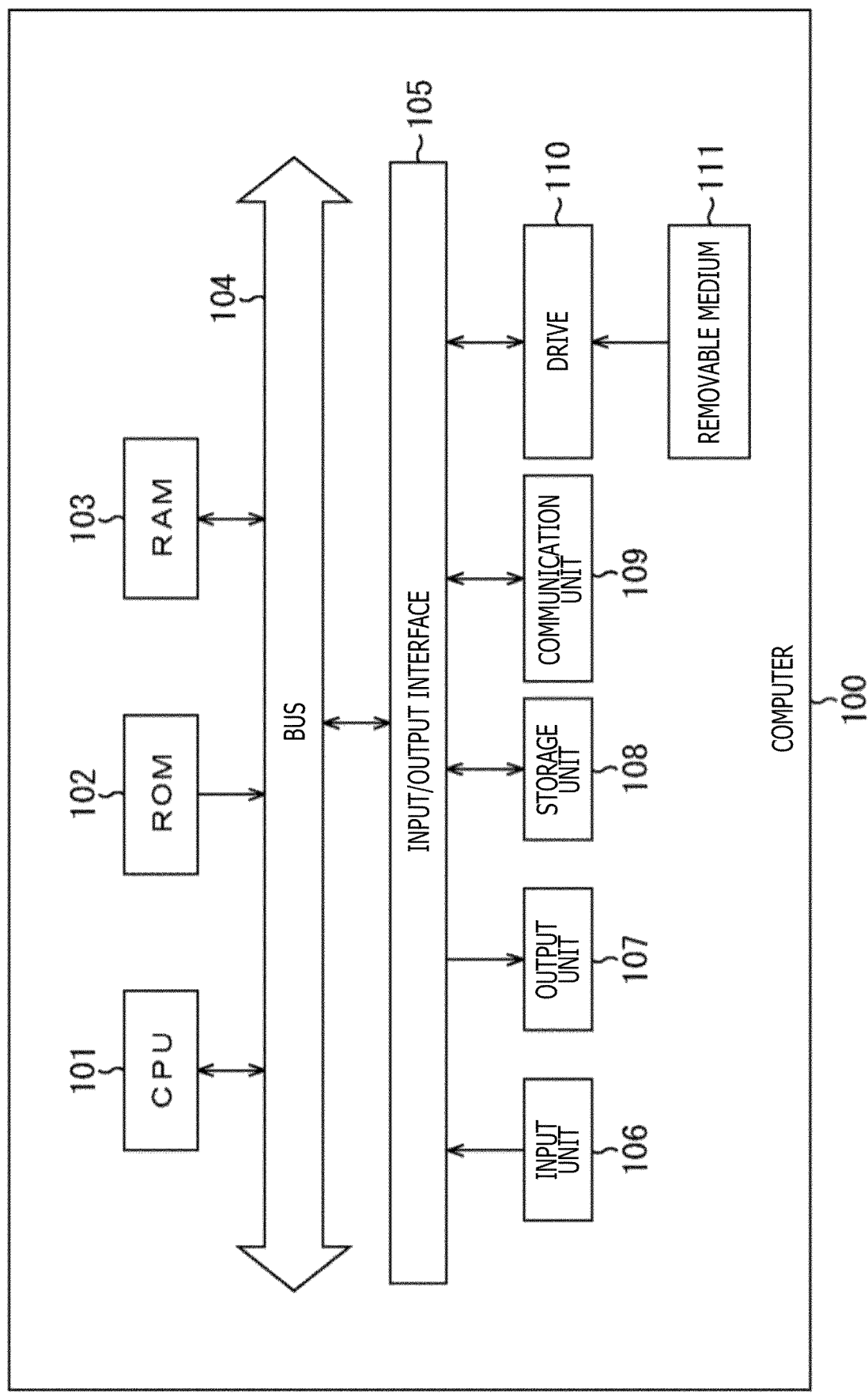

INFORMATION PRESENTING APPARATUS AND INFORMATION PRESENTING METHOD

CROSS REFERENCE TO PRIOR APPLICATION

This application is a National Stage Patent Application of PCT International Patent Application No. PCT/JP2017/029341 (filed on Aug. 15, 2017) under 35 U.S.C. § 371, which claims priority to Japanese Patent Application No. 2016-166783 (filed on Aug. 29, 2016), which are all hereby incorporated by reference in their entirety.

TECHNICAL FIELD

The present technology relates to an information presenting apparatus and an information presenting method, and more particularly to an information presenting apparatus and an information presenting method that are capable of explicitly presenting the essential point of a voice output.

BACKGROUND ART

Heretofore, there has bees a technology for reading aloud character information, i.e., a technology for synthesizing a voice representing character information and outputting the synthesized voice to present it to the user.

However, in a case where a voice is synthesized and output that corresponds to a newspaper article or the like that is written on the assumption that it will be read by people, the voice output tends to be monotonous, making it difficult for the user to understand where the essential point is.

There has heretofore bees proposed a method of making it easy for the user to develop a better understanding of a voice output that is produced based on character information. Specifically, there has been proposed a method of displaying a character, hereinafter referred to as "agent," that speaks words on a screen, and making the agent output a voice corresponding to character information while the agent is expressing human-like emotions according to the contents of the character information (see, for example, PTL 1). There has also been proposed a method of converting character information represented by written words into spoken words and reading the spoken words out loud (see, for example, PTL 2).

CITATION LIST

Patent Literature

[PTL 1]
  JP 2003-509976T
[PTL 2]
  JP 2000-339250A

SUMMARY

Technical Problems

According to the method of controlling the agent to speak words while expressing emotions, the essential point of the talk is not explicitly indicated, but the user needs to read the essential point from the facial expression of the agent. The essential point, etc. still remains difficult for the user to understand.

According to the method of reading the converted spoken words out loud, though the user finds it easier to understand the spoken words than the written words, the essential point, etc. is nevertheless difficult for the user to understand.

The present technology has been made under the circumstances. It is an object of the present technology to make it easy for the user to understand presentation information that is output as a voice.

Solution to Problems

An information presenting apparatus according to an aspect of the present technology includes an acquirer that acquires presentation information to be presented to a user, a generator that generates support information to be presented, together with the presentation information, to the user, based on the acquired presentation information, and synthesizes a voice that corresponds to the generated support information, and a presenter that presents the synthesized voice that corresponds to the support information, as an utterance of a first agent.

The presenter can output the synthesized voice that corresponds to the support information as the utterance of the first agent by displaying a character image of the first agent.

The generator can further synthesize a voice that corresponds to the presentation information, and the presenter can further output the synthesized voice that corresponds to the presentation information as an utterance of a second agent.

The presenter can output the synthesized voice that corresponds to the presentation information as the utterance of the second agent by displaying a character image of the second agent.

The information presenting apparatus according to the aspect of the present technology can further include an analyzer that analyzes the acquired presentation information. The generator can generate the support information based on a result of the analysis of the presentation information.

The information presenting apparatus according to the aspect of the present technology can further include a detector that detects a state of the user. The presenter can output the synthesized voice that corresponds to the support information as the utterance of the first agent depending on the detected state of the user.

The detector can further detect an attribute of the user, and the presenter can output the synthesized voice that corresponds to the support information as the utterance of the first agent depending on the detected attribute of the user.

The generator can generate the support information that includes an emotional word regarding the presentation information.

The generator can generate the support information that includes an essential point of the presentation information.

The generator can generate the support information that includes a question regarding contents of the presentation information.

The generator can generate the support information that includes user information related to the presentation information.

The generator can generate the support information based on an explanatory document that explains a video image related to the presentation information.

The generator can generate response information to be presented as an utterance of a response of the second agent to the support information to be presented as the utterance of the first agent, and synthesizes a voice that corresponds to the response information, and the presenter can further output the synthesized voice that corresponds to the response information as the utterance of the second agent.

The generator can generate response information to be presented as an utterance of a response of the second agent to an utterance of the user with respect to the presentation information presented as the utterance of the second agent, and synthesize a voice that corresponds to the response information, and the presenter can further output the synthesized voice that corresponds to the response information as the utterance of the second agent.

An information presenting method according to an aspect of the present technology includes the steps, performed by an information presenting apparatus, of acquiring presentation information to be presented to a user, generating support information to be presented, together with the presentation information, to the user, based on the acquired presentation information, and synthesizing a voice that corresponds to the generated support information, and presenting the synthesized voice that corresponds to the support information, as an utterance of a first agent.

According to an aspect of the present technology, presentation information to be presented to the user is acquired, support information to be presented, together with the presentation information, to the user, is generated based on the acquired presentation information, a voice that corresponds to the generated support information is synthesized, the synthesized voice that corresponds to the support information is presented as an utterance of a first agent.

Advantageous Effect of Invention

According to an aspect of the present technology, it is possible to make it easy for the user to understand presentation information that is output as a voice.

BRIEF DESCRIPTION OF DRAWINGS

FIG. 16 is a diagram illustrating an example of support information where the information presenting apparatus is applied to a remote family watch over system.

FIG. 20 is a block diagram illustrating a configurational example of a general-purpose computer.

DESCRIPTION OF EMBODIMENT

Figure 1:
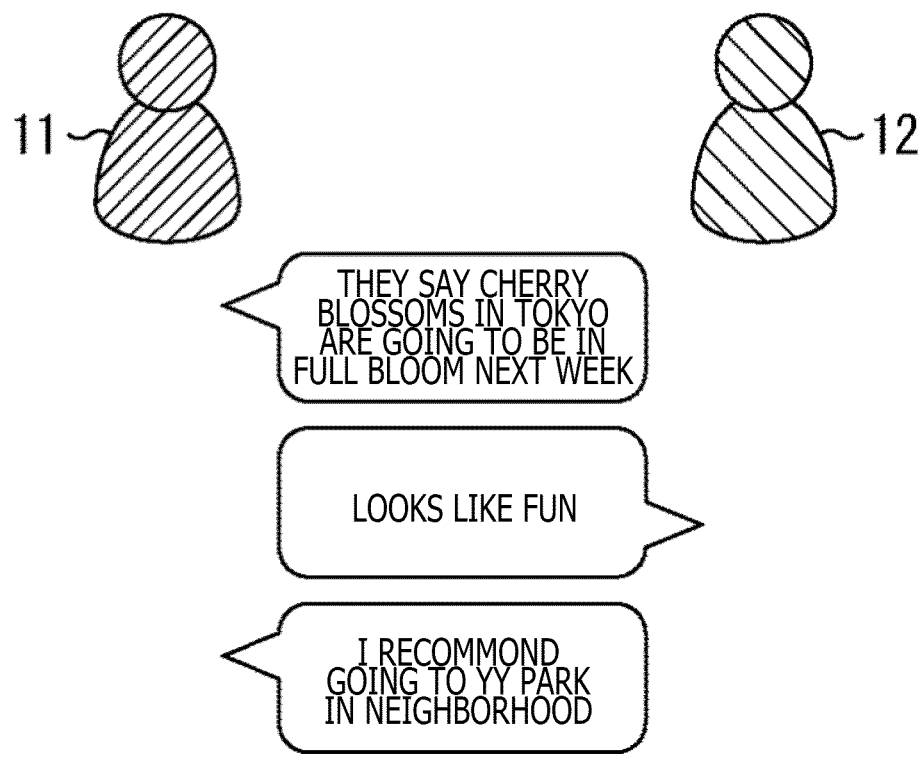
FIG. 1 is a diagram illustrating an example in which an emotional word is presented as support information.

The best mode for carrying out the present technology, hereinafter referred to as "embodiment," will hereinafter be described in detail with reference to the drawings.

<Description of an Outline of the Present Technology>

First, an outline of the present technology will be described below. The present technology presents to a user a voice that corresponds to character information, hereinafter referred to as "presentation information," and establishes two types of agents, i.e., a main agent and a sub-agent, that speak words.

The main agent utters a voice corresponding to presentation information, whereas the sub-agent, in response to the main agent, acting like its companion, utters a voice corresponding to support information that is produced based on the presentation information. The support information helps the user deepen their understanding of the presentation information or to attract the attention of the user, as described in detail later.

The voice generated by the sub-agent as corresponding to support information may be set to either a mode or static information presenting process in which it is output at all times regardless of the state of the user, or a mode or dynamic information presenting process in which it starts to be output and ended depending on the state of the user.

Both agents are displayed on a display and make thereon various expressive motions, i.e., speak with body gestures and hand gestures, and change body gestures, hand gestures, facial expressions, etc. that indicate emotions such as surprise, joy, sadness, disappointment, etc., in accordance with contents of a voice output.

In order for the user to be able to distinguish between both agents, their types of voice or their manners of speaking may be changed, or the voice generated by one of the agents may be output from a left speaker whereas the voice generated by the other agent may be output from a right speaker. In addition, the appearances of both agents, e.g., their body types, their clothes, etc. may be changed. Furthermore, their manners of speaking may be changed depending on the contents of presentation information and support information, e.g., they may speak cheerfully when talking about good news and they may speak calmly when talking about gloomy news. Moreover, a plurality of agents may be made available as each of both agents, and they may be switched around depending on the contents of presentation information and support information.

Note that each of both agents is not limited to one figure, but may exist as two or more figures. For example, one figure of the main agent and two or more figures of the sub-agent may enter the scene simultaneously.

In addition, the display may display only one of both agents. In such a case, the display may display presentation information without displaying the main agent and its voice may be output, and the display may display only the sub-agent and a voice corresponding to support information may be output.

Furthermore, the display may not display both agents, but may display presentation information and support information, and a voice corresponding to each of the information may be output.

As described above, since an agent is displayed and its voice is output according to the present technology, it is assumed that the technology may be applied to an apparatus having at least a speaker and a display, such as a television receiver, a tablet-type PC, or the like. However, the present technology is also applicable to an apparatus free of a speaker. Furthermore, the present technology may be applied to a robot where a single robot plays the roles of the main agent and the sub-agent or may be applied to a plurality of robots where a certain robot plays the role of the main agent and another robot plays the role of the sub-agent.

<Example in which the Sub-Agent Presents an Emotional Word as Support Information>

FIG. 1 is a diagram illustrating an example in which a sub-agent 12 presents an emotional word as support information.

In the example illustrated in FIG. 1, the presentation information "THEY SAY CHERRY BLOSSOMS IN TOKYO ARE GOING TO BE IN FULL BLOOM NEXT WEEK" spoken by a main agent 11 is analyzed, and support information "LOOKS LIKE FUN" including an emotional word is generated depending on the result of the analysis and output as a voice of the sub-agent 12. By outputting the voice corresponding to the support information including the emotional word, it is expected to provide an effect of attracting the user's interest to the presentation information. Note that an exclamation such as "OH," "WOW," or the like may be used instead of an emotional word.

<Example in which the Sub-Agent Repeats an Essential Point as Support Information>

Figure 2:
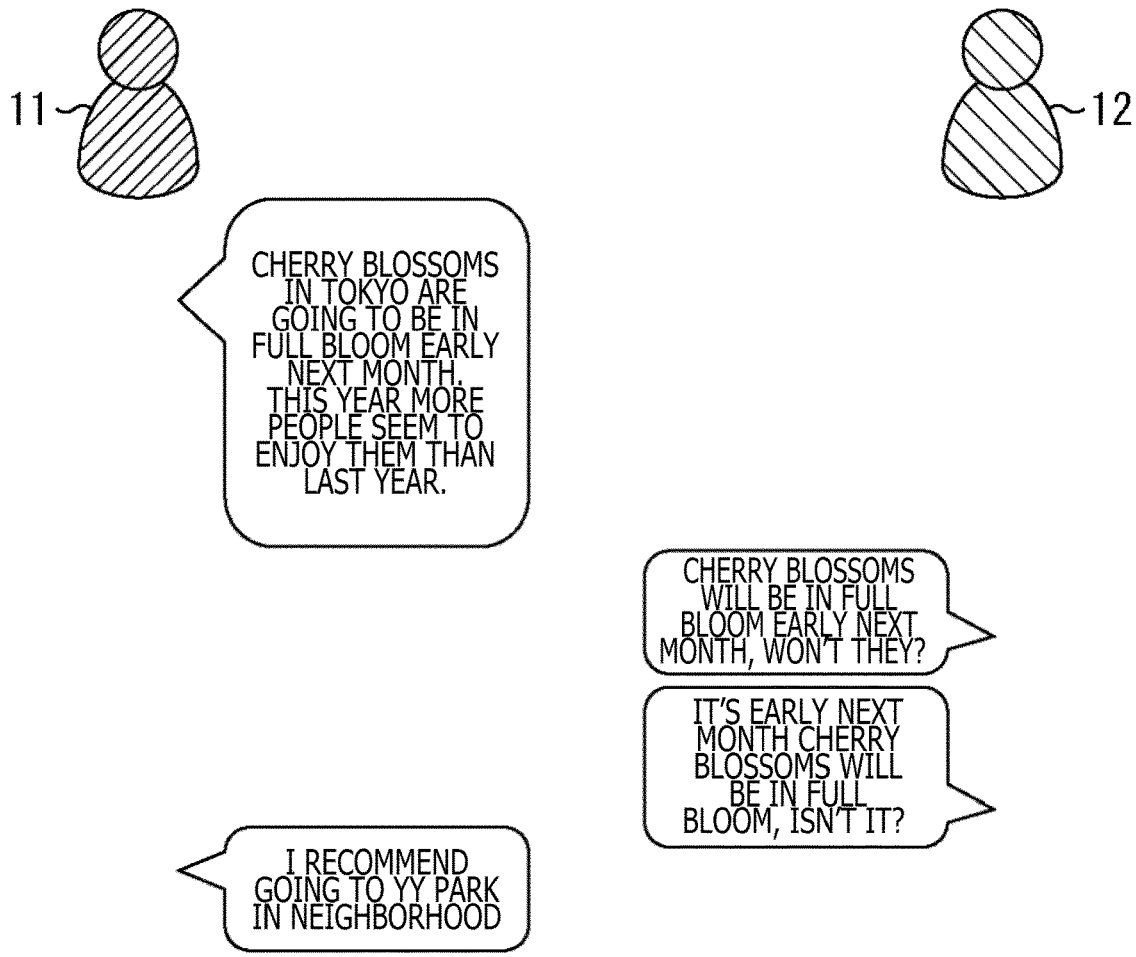
FIG. 2 is a diagram illustrating an example in which an essential point is repeated as support information.

FIG. 2 is a diagram illustrating an example in which an essential point of presentation information is repeated as support information.

In the example illustrated in FIG. 2, the presentation information "CHERRY BLOSSOMS IN TOKYO ARE GOING TO BE IN FULL BLOOM EARLY NEXT MONTH. THIS YEAR MORE PEOPLE SEEM TO ENJOY THEM THAN LAST YEAR." spoken by the main agent 11 is analyzed, the essential point "IN FULL BLOOM EARLY NEXT MONTH" in this case is extracted depending on the result of the analysis, and the support information "CHERRY BLOSSOMS WILL BE IN FULL BLOOM EARLY NEXT MONTH, WON'T THEY?" including the extracted essential point is generated and repeated as a voice of the sub-agent 12. Note that some words of the extracted essential point may be inverted to generate the support information "IT'S EARLY NEXT MONTH CHERRY BLOSSOMS WILL BE IN FULL BLOOM, ISN'T IT?" By repeating the essential point as the support information, it is expected to provide an effect of deepening the user's understanding.

<Example in which the Sub-Agent Presents a Question Whose Answer is Represented by an Essential Point as Support Information>

Figure 3:
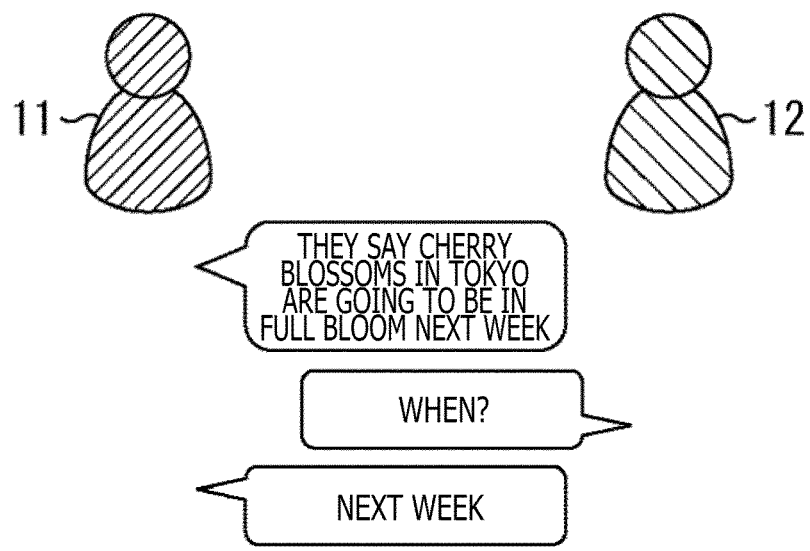
FIG. 3 is a diagram illustrating an example in which a question is presented whose answer is represented by an essential point as support information.
Figure 4:
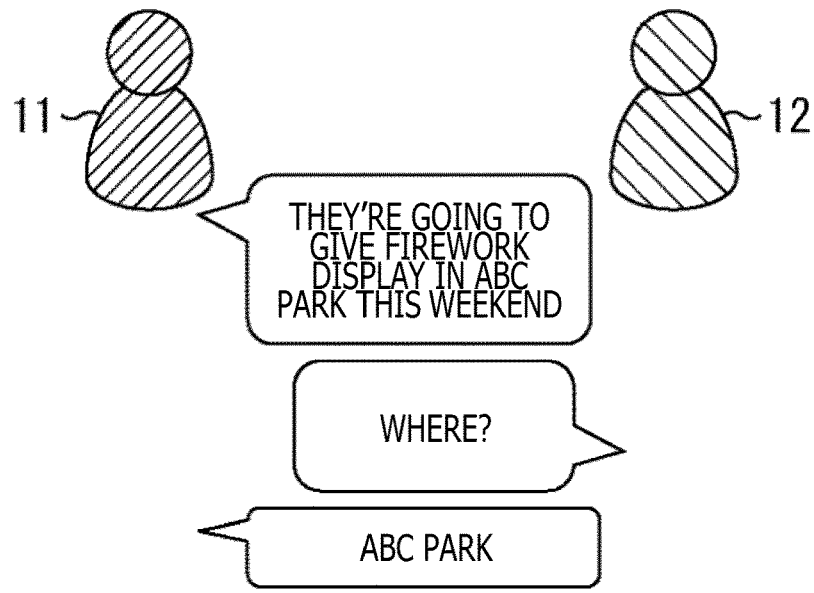
FIG. 4 is a diagram illustrating another example in which a question is presented whose answer is represented by an essential point as support information.

FIGS. 3 and 4 illustrate examples in which a question is presented whose answer is represented by an essential point of presentation information as support information. A question as support information is selected from 5W1H (when, where, who, what, why, how) depending on an essential point.

In the example illustrated in FIG. 3, the presentation information "THEY SAY CHERRY BLOSSOMS IN TOKYO ARE GOING TO BE IN FULL BLOOM NEXT WEEK" spoken by the main agent 11 is analyzed, the essential point "NEXT WEEK" in this case is extracted depending on the result of the analysis, and the question "WHEN?" as support information whose answer is represented by the extracted essential point is selected and output as a voice of the sub-agent 12. Furthermore, the voice "NEXT WEEK" is output from the main agent 11 to answer the question from the sub-agent 12.

In the example illustrated in FIG. 4, the presentation information "THEY'RE GOING TO GIVE FIREWORK DISPLAY IN ABC PARK THIS WEEKEND" spoken by the main agent 11 is analyzed, the essential point "ABC PARK" in this case is extracted depending on the result of the analysis, and the question "WHERE?" as support information whose answer is represented by the extracted essential point is selected and output as a voice of the sub-agent 12. Furthermore, the voice "ABC PARK" is output from the main agent 11 to answer the question from the sub-agent 12.

When the sub-agent 12 asks the question whose answer is represented by the essential point as support information, the main agent 11 repeats the essential point of the presentation information. Therefore, it is expected to provide an effect of deepening the user's understanding and preventing the user from failing to hear the essential point.

In addition, if the voice of the user to ask a similar question is detected prior to the question asked by the sub-agent 12, the main agent 11 may answer the user's question by way of a voice.

Specifically, the main agent 11 may react to a reaction of the user. In this case, since the user can ask the main agent 11 a question or a word that the user has missed and receive an answer to it, it is expected to provide an effect of deepening the user's understanding and preventing the user from failing to hear the essential point.

<Example in which the Sub-Agent Presents Related Information of a User as Support Information>

Figure 5:
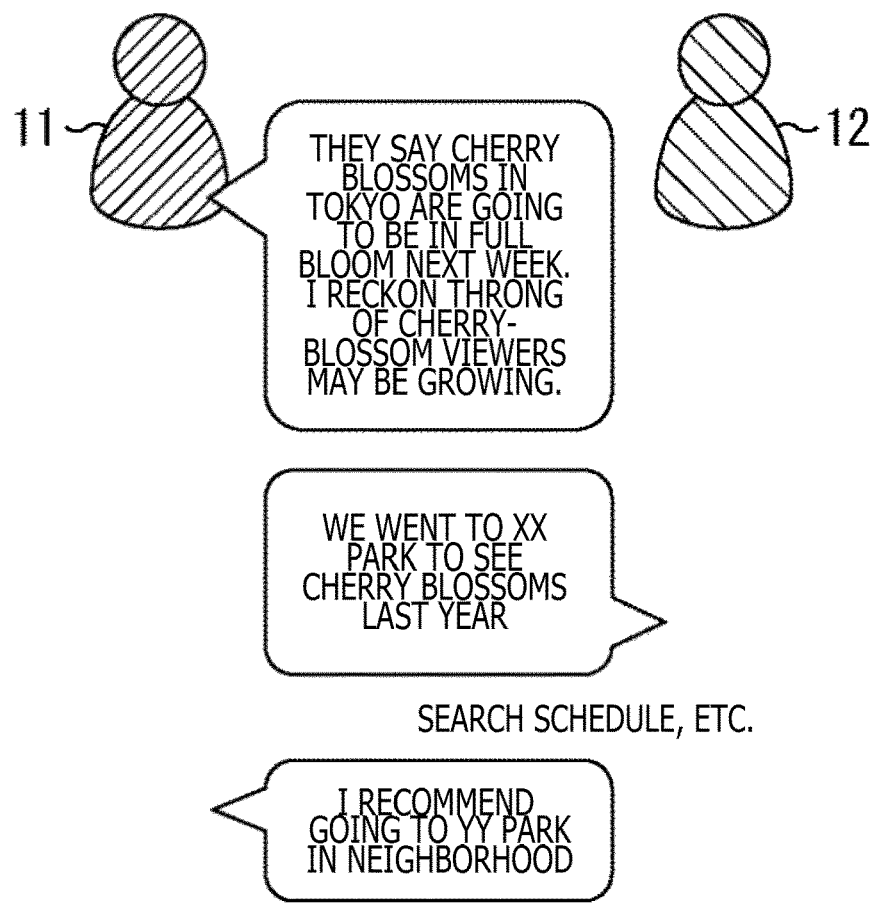
FIG. 5 is a diagram illustrating an example is which related information of a user is presented as support information.
Figure 6:
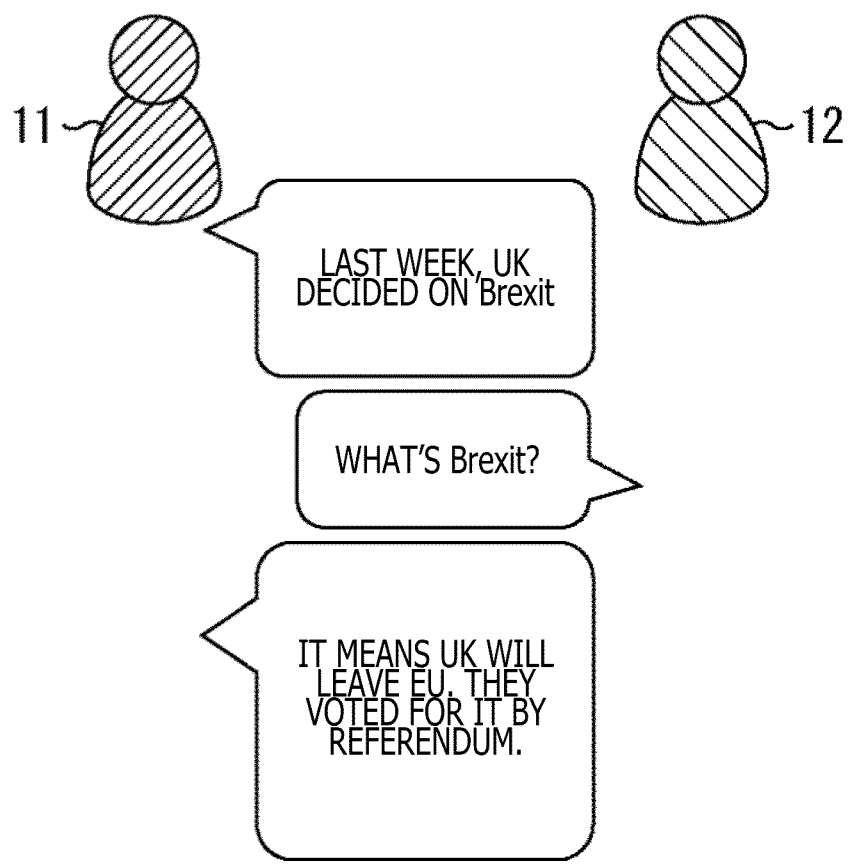
FIG. 6 is a diagram illustrating another example in which related information of a user is presented as support information.

FIGS. 5 and 6 illustrate examples in which user information related to presentation information is presented as support information. A user DB shall be searched for information of the user in relation to presentation information. Note that the user DB has registered therein user's schedule, mail, address book, created documents, searching history, browsing history, entered characters, music, images, moving images, and so on.

In the example illustrated in FIG. 5, the presentation information "THEY SAY CHERRY BLOSSOMS IN TOKYO ARE GOING TO BE IN FULL BLOOM NEXT WEEK. I RECKON THRONG OF CHERRY-BLOSSOM VIEWERS MAY BE GROWING." spoken by the main agent 11 is analyzed, the important words "CHERRY-BLOSSOM VIEWING" in this case are extracted, and the user DB is searched for them. If the extracted important words are registered in the user DB, then the support information "WE WENT TO XX PARK TO SEE CHERRY BLOSSOMS LAST YEAR" in this case is generated based on the result of the search, and its voice is output from the sub-agent 12.

Note that music or sound effect related to the important words may be reproduced, or an image or a moving image related to the important words may be displayed.

In the example illustrated in FIG. 6, the presentation information "LAST WEEK, UK DECIDED ON Brexit" spoken by the main agent 11 is analyzed, the important word "Brexit" in this case is extracted depending on the result of the analysis, and the user DB is searched for it. If the extracted important word is not registered in the user DB, then the support information "WHAT'S Brexit?" in this case is generated to ask about the important word and is output from the sub-agent 12.

Moreover, the important word "Brexit" in this case that is not registered in the user DB is searched for in WikiPedia or the like on the Internet, the presentation information "IT MEANS UK WILL LEAVE EU. THEY VOTED FOR IT BY REFERENDUM." based on the result of the search is generated and its voice is output from the main agent 11 as an answer to the question from the sub-agent 12.

When the sub-agent speaks the user's information related to the presentation information as the support information, it is expected to provide an effect of attracting the user's interest to the presentation information. By teaching the user the meaning of the word that the user is unaware of, it is expected to provide an effect of increase the satisfaction of the user.

Note that the support information is not limited to the examples described above. The examples of the support information described above can be used in various appropriate combinations.

<Configurational Example of an Information Presenting Apparatus According to the Embodiment of the Present Technology>

Figure 7:
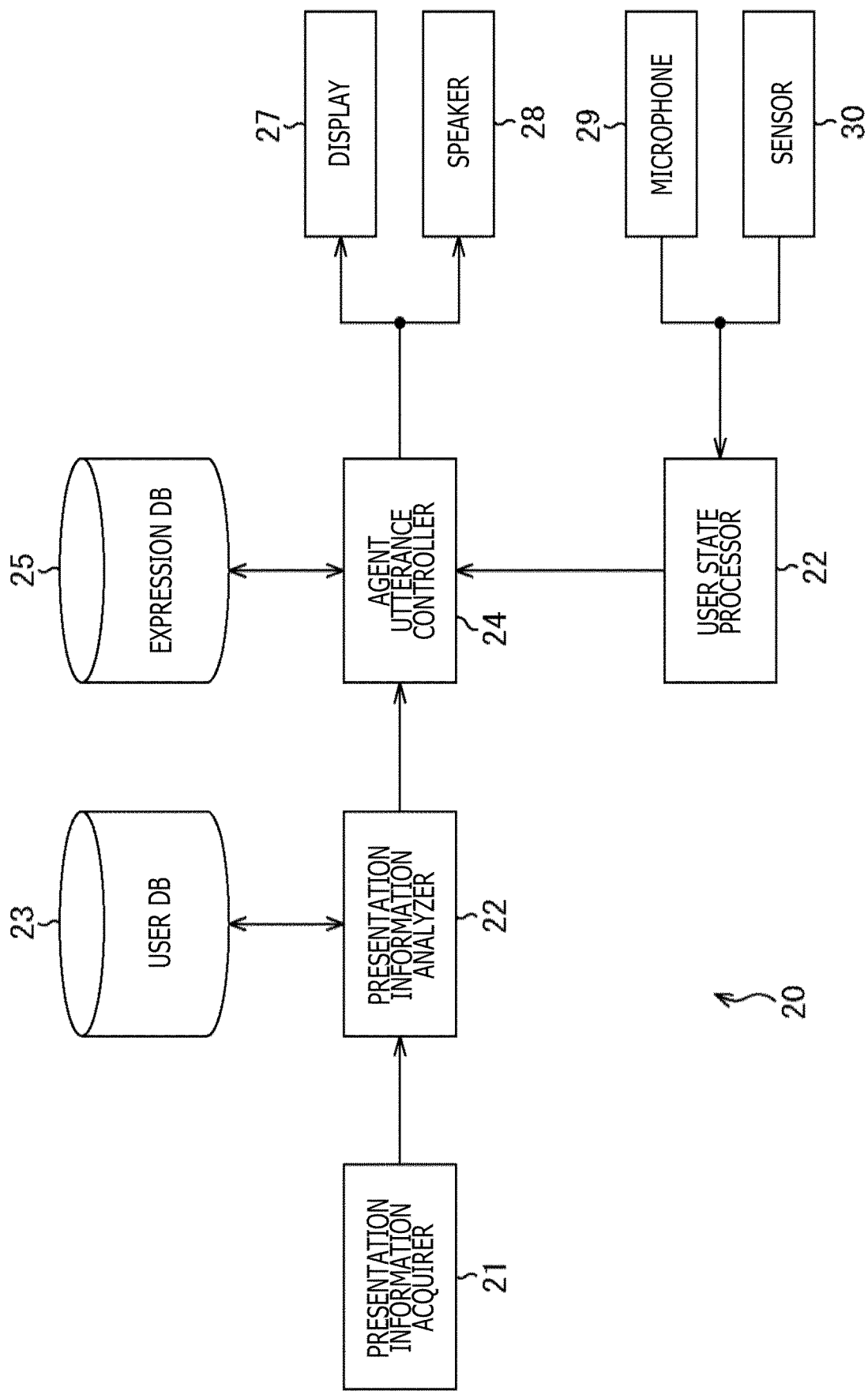
FIG. 7 is a block diagram illustrating a configurational example of an information presenting apparatus to which the present technology is applied.

FIG. 7 is a block diagram illustrating a configurational example of an information presenting apparatus that realizes the various examples described above, according to the embodiment of the present technology.

The information presenting apparatus, denoted by 20, includes a presentation information acquirer 21, a presentation information analyzer 22, a user DB 23, an agent utterance controller 24, an expression DB 25, a user state processor 26, a display 27, a speaker 28, a microphone 29, and a sensor 30.

The presentation information acquirer 21 acquires presentation information in the form of text data to be presented as a voice to the user from a predetermined server on the Internet, and supplies the acquired presentation information to the presentation information analyzer 22. The presentation information analyzer 22 performs an analysis such as a natural language analysis, for example, on the presentation information, and outputs the result of the analysis to the agent utterance controller 24.

The user DB 23 has registered therein user's schedule, mail, address book, created documents, searching history, browsing history, entered characters, and so on.

The agent utterance controller 24 controls voices of the main agent 11 and the sub-agent 12. In other words, the agent utterance controller 24 synthesizes a voice corresponding to the presentation information and controls the speaker 28 to output the synthesized voice as a voice of the main agent 11. The agent utterance controller 24 also generates support information based on the result of the analysis of the presentation information, synthesizes a voice corresponding to the generated support information, and controls the speaker 28 to output the synthesized voice as a voice of the sub-agent 12.

Furthermore, as indicated by the examples described above, the agent utterance controller 24 generates response information as a response of the main agent 11 to the utterance such as of a question or the like of the sub-agent 12, synthesizes a voice corresponding to the response, and controls the speaker 28 to output the synthesized voice.

Note that methods of expressing the voices corresponding to the presentation information, the support information, and the response information may be changed by referring to the expression DB 25.

Furthermore, the agent utterance controller 24 controls displaying of the main agent 11 and the sub-agent 12. Specifically, the agent utterance controller 24 controls the display 27 to display the main agent 11 and the sub-agent 12 and controls them to make various expressive motions, i.e., speak with body gestures and hand gestures, and express emotions such as surprise, disappointment, etc. to a voice output.

The expression DB 25 has registered therein various ways of speaking and expressive motions depending on different genders, ages, jobs, birthplaces, etc., for example, to be applied to the main agent 11 and the sub-agent 12. The agent utterance controller 24 can produce voices of the main agent 11 and the sub-agent 12 and control the both agents to make various expressive motions by referring to the expression DB 25. The user can tell whether a voice belongs to the main agent 11 or the sub-agent 12 by listening to the voice.

The user state processor 26 identifies a state of the user, which represents the degree of a response to the presentation information, the frequency of responses, the facial expression, or the like, based on the user's utterance entered from the microphone 29 and the video image entered from the sensor 30, and sends the identified result to the agent utterance controller 24.

Under the control of the agent utterance controller 24, the display 27 displays images of the main agent 11 and the sub-agent 12. Under the control of the agent utterance controller 24, the speaker 28 outputs voices of the main agent 11 and the sub-agent 12.

The microphone 29 collects the utterance of the user and voices around the information presenting apparatus 20, and outputs the collected utterance and voices to the user state processor 26. The sensor 30 captures a video image around the information presenting apparatus 20, and outputs the video image to the user state processor 26.

Note that, of the components described above of the information presenting apparatus 20, the display 27, the speaker 28, the microphone 29, and the sensor 30 are not required to be housed in one casing though they need to be placed in the vicinity of the user. In other words, the display 27 and the speaker 28, for example, may be housed in separate casings, respectively.

Furthermore, of the components described above of the information presenting apparatus 20, those other than the display 27, the speaker 28, the microphone 29, and the sensor 30 may be placed in arbitrary locations where they can communicate with each other. For example, they may be placed in a cloud server on the Internet.

Example of an Analysis of Presentation Information>

Next, an example of an analysis of presentation information by the presentation information analyzer 22, generation of support information by the agent utterance controller 24, a question asked by the sub-agent 12 as support information, and an utterance of the main agent 11 in answering a question from the user will be described below.

Figure 8:
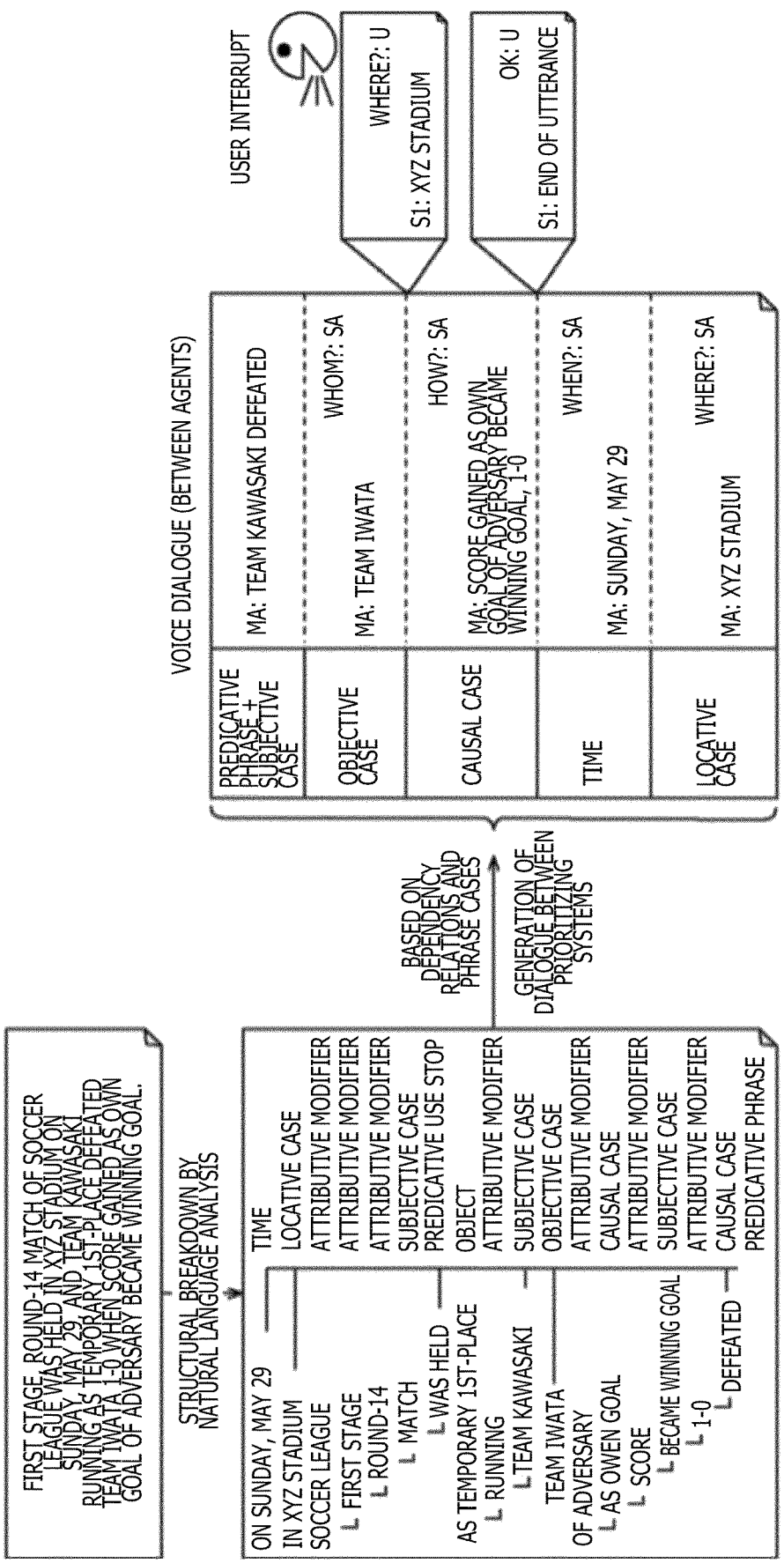
FIG. 8 is a diagram illustrating an example of an analysis of presentation information.

FIG. 8 is a diagram illustrating an example of an analysis of presentation information by the presentation information analyzer 22. As illustrated in FIG. 8, when the presentation information analyzer 22 is supplied with presentation information, the presentation information analyzer 22 performs a natural language analysis on the presentation information for a structural breakdown thereof. The result of the natural language analysis is sent to the agent utterance controller 24, which produces a dialogue, i.e., questions and answers, between the main agent 11 and the sub-agent 12 or the user, based on dependency relations and cases of phrases, i.e., time, locative case, subjective case, object, objective case, causal case, etc.

In the example illustrated in FIG. 8, when the presentation information "FIRST STAGE, ROUND-14 MATCH OF SOCCER LEAGUE WAS HELD IN XYZ STADIUM ON SUNDAY, MAY 29, AND TEAM KAWASAKI RUNNING AS TEMPORARY 1ST-PLACE DEFEATED TEAM IWATA 1-0 WHEN SCORE GAINED AS OWN GOAL OF ADVERSARY BECAME WINNING GOAL" is acquired, a natural language analysis is performed on the presentation information. Then, a dialogue is produced which represents "(when) ON MAY 29, SUNDAY," "(where) XYZ STADIUM," "(who) TEAM KAWASAKI," "(what) DEFEATED TEAM IWATA," and "(how) 1-0 WHEN SCORE GAINED AS OWN GOAL OF ADVERSARY BECAME WINNING GOAL" as 5W1H of the presentation information.

<About a Static Information Presenting Process of the Information Presenting Apparatus 20>

Figure 9:
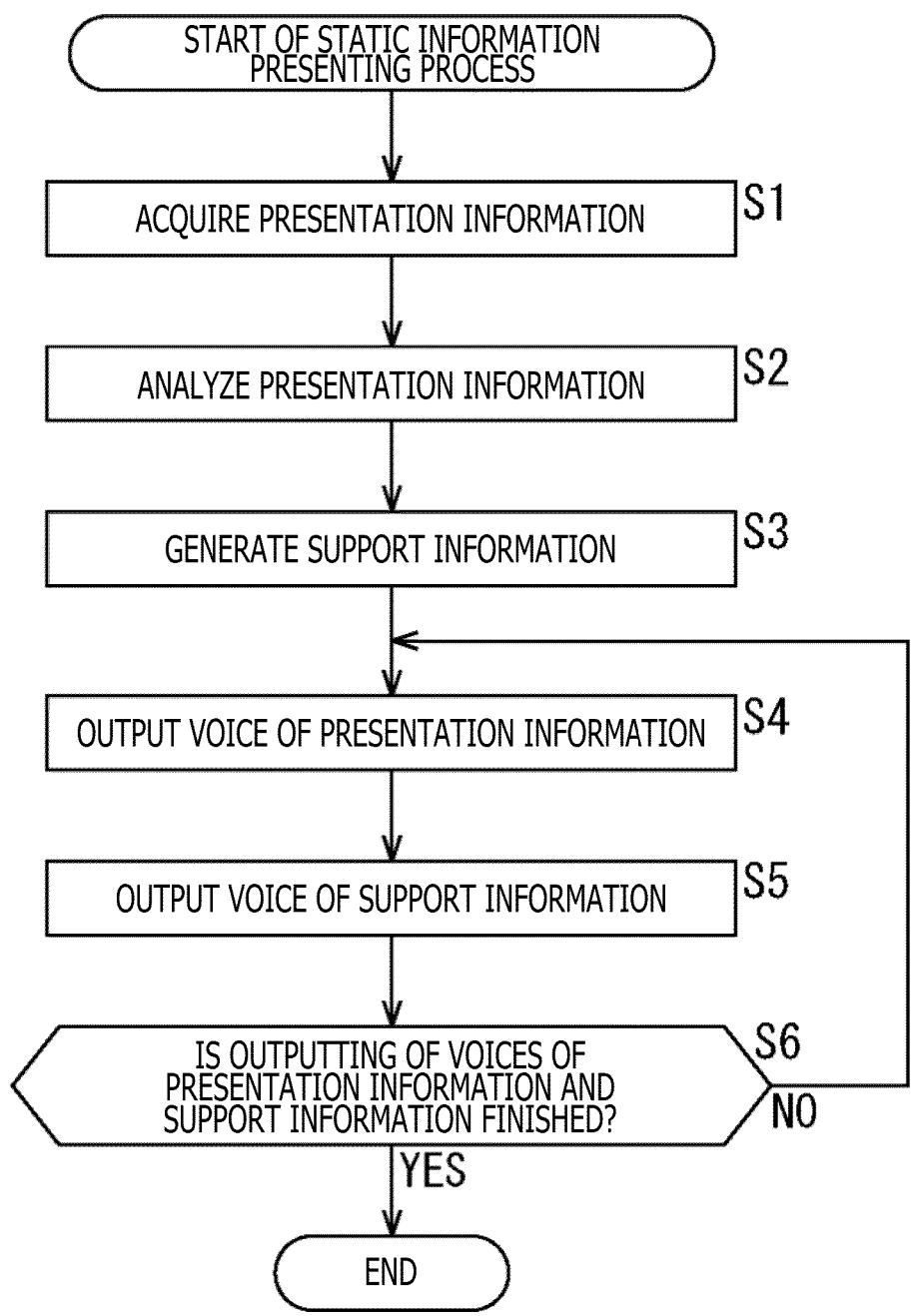
FIG. 9 is a flowchart for explaining a static information presenting process.

FIG. 9 is a flowchart for explaining a static information presenting process carred out by the information presenting apparatus 20.

The static information presenting process is a process for outputting a voice of support information in timed relation to the progress of the outputting of a voice of presentation information regardless of the state of the user.

In step S1, the presentation information acquirer 21 acquires presentation information from a predetermined server on the Internet, for example, and supplies the acquired presentation information to the presentation information analyzer 22. In step S2, the presentation information analyzer 22 analyzes the presentation information and outputs the result of the analysis to the agent utterance controller 24. In step S3, the agent utterance controller 24 generates support information based on the result of the analysis of the presentation information.

In step S4, the agent utterance controller 24 synthesizes a voice corresponding to the presentation information and controls the speaker 28 to output the synthesized voice as a voice of the main agent 11. In step S5, the agent utterance controller 24 synthesizes a voice corresponding to the support information and controls the speaker 28 to output the synthesized voice as a voice of the sub-agent 12.

In step S6, the agent utterance controller 24 determines whether the outputting of the voices corresponding to the presentation information and the support information is finished. Until it is determined that the outputting of the voices is finished, control returns to step S4 to repeat the processing of steps S4 through S6. If the agent utterance controller 24 determines that the outputting of the voices corresponding to the presentation information and the support information is finished, then the static information presenting process is ended.

According to the static information presenting process, not only the main agent 11 utters the voice of the presentation information, but also the sub-agent 12 utters the voice of the support information. Therefore, it is possible for the user to deepen the understanding of the presentation information.

<About a Dynamic Information Presenting Process of the Information Presenting Apparatus 20>

Figure 10:
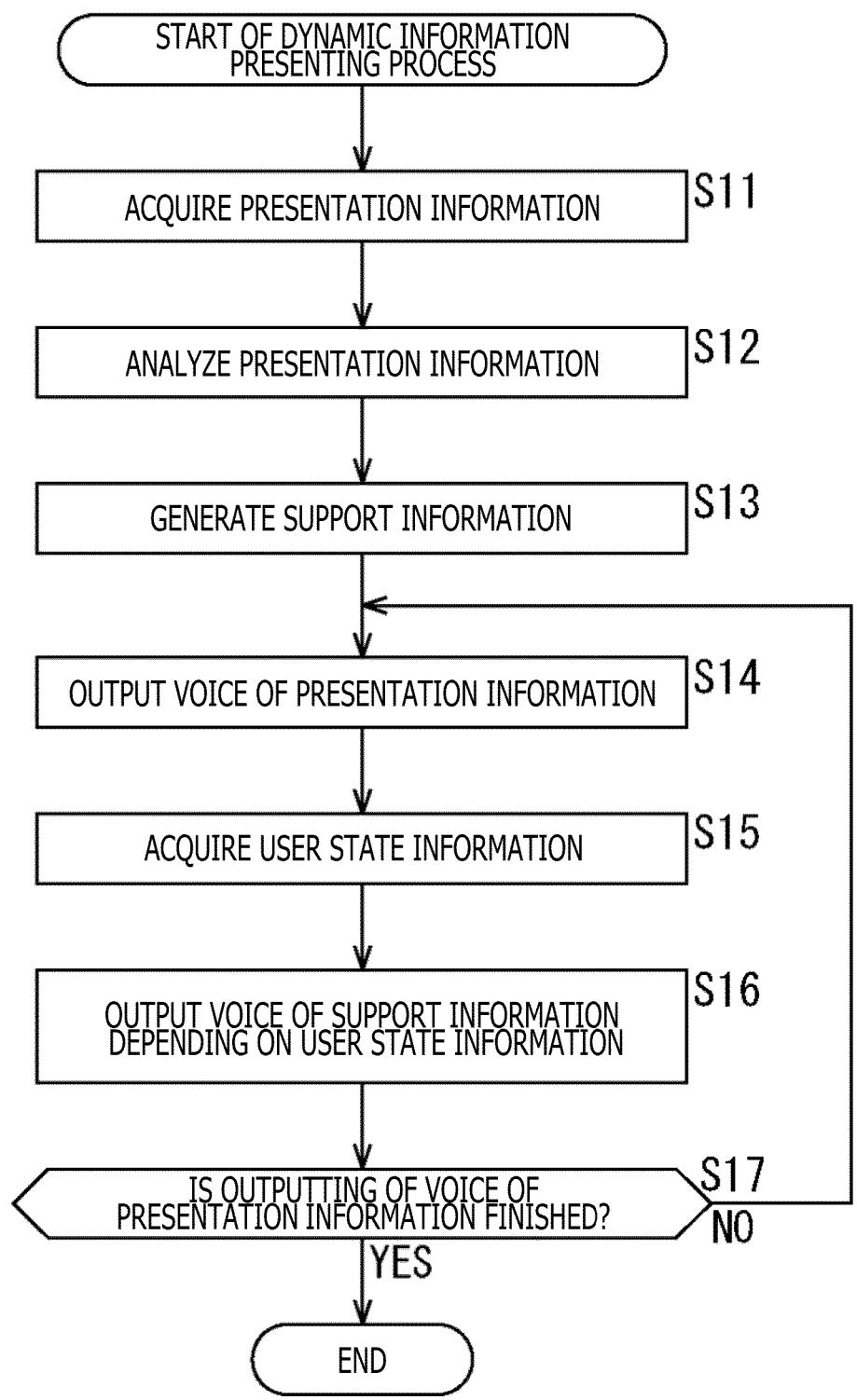
FIG. 10 is a flowchart for explaining a dynamic information presenting process.

FIG. 10 is a flowchart for explaining a dynamic information presenting process carried out by the information presenting apparatus 20.

The dynamic information presenting process is a process for outputting voices of support information in timed relation to the progress of the outputting of voices of the presentation information depending on the state of the user.

In step S11, the presentation information acquirer 21 acquires presentation information from a predetermined server on the Internet, for example, and supplies the acquired presentation information to the presentation information analyzer 22. In step S12, the presentation information analyzer 22 analyzes the presentation information and outputs the result of the analysis to the agent utterance controller 24. In step S13, the agent utterance controller 24 generates support information based on the result of the analysis of the presentation information. Note that generation of support information may be performed in a case where a voice corresponding to the support information starts to be output in step S16 to be described later.

In step S14, the agent utterance controller 24 synthesizes a voice corresponding to the presentation information and controls the speaker 28 to output the synthesized voice as a voice of the main agent 11.

In step S15, the agent utterance controller 24 acquires user state information representing the state of the user from the user state processor 26. In step S16, the agent utterance controller 24 synthesizes a voice corresponding to the support information depending on the state of the user represented by the user state information and controls the speaker 28 to output the synthesized voice as a voice of the sub-agent 12.

The state of the user refers to the degree of a response to the presentation information represented by the voice of the main agent 11, the frequency of responses, the facial expression, and so on. When the attention of the user to the presentation information is turned away, the voice that corresponds to the support information starts to be output. When the attention of the user comes back to the presentation information, the voice that corresponds to the support information stops being output.

Note that the outputting of the voice corresponding to the support information may be controlled depending on conditions other than the state of the user, e.g., the elapse of a given time from the start of the outputting of the voice of the presentation information.

In step S17, the agent utterance controller 24 determines whether the outputting of the voice corresponding to the presentation information is finished. Until it is determined that the outputting of the voice is finished, control returns to step S14 to repeat the processing of steps S14 through S17. If the agent utterance controller 24 determines that the outputting of the voice corresponding to the presentation information is finished, then the dynamic information presenting process is ended.

According to the dynamic information presenting process, not only the main agent 11 utters the voice of the presentation information, but also the sub-agent 12 starts to utter the voice of the support information depending on the state of the user. Therefore, it is possible for the user to deepen the understanding of the presentation information and it is expected to attract user's attention to or user's interest in the presentation information.

<Applications of the Information Presenting Apparatus 20>

Various applications of the information presenting apparatus 20 will hereinafter be described.

<Application to a Signage Apparatus>

Figure 11:
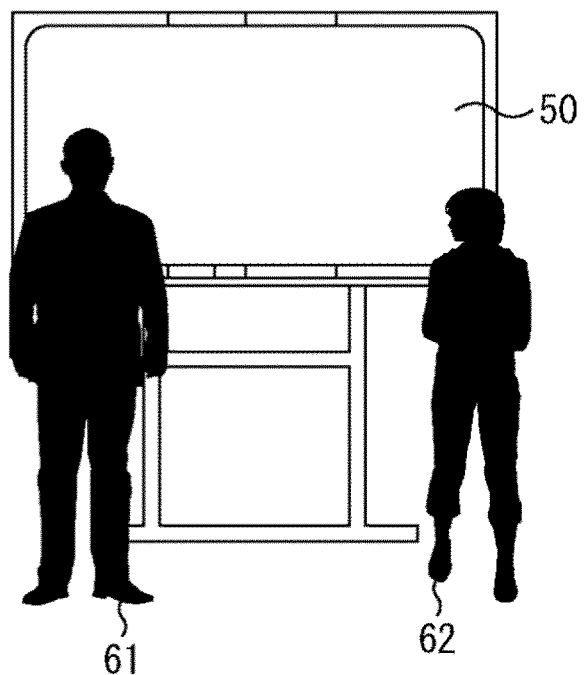
FIG. 11 is a diagram illustrating an application where the information presenting apparatus is applied to a signage apparatus.

FIG. 11 is a diagram illustrating an application where the information presenting apparatus 20 is applied to a signage apparatus 50 for presenting guidance information which may be installed in tourist facilities, for example. The signage apparatus 50 is illustrated as being used by a plurality of users 61 and 62.

The signage apparatus 50 can identify the states and attributes, i.e., adults, children, men, females, parents, offspring, etc., of the users 61 and 62, and dynamically change support information.

Figure 12:
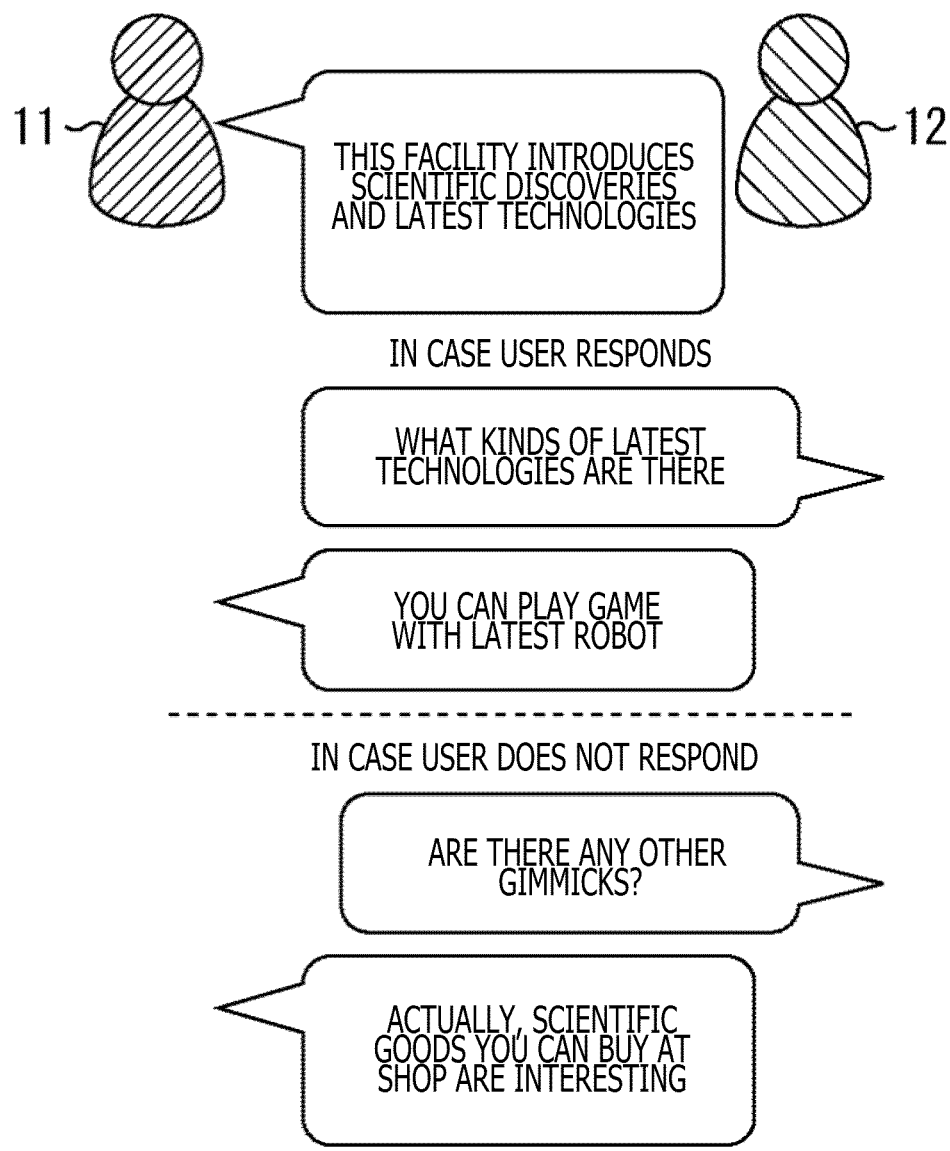
FIG. 12 is a diagram illustrating an example in which the signage apparatus dynamically changes a support presentation.
Figure 13:
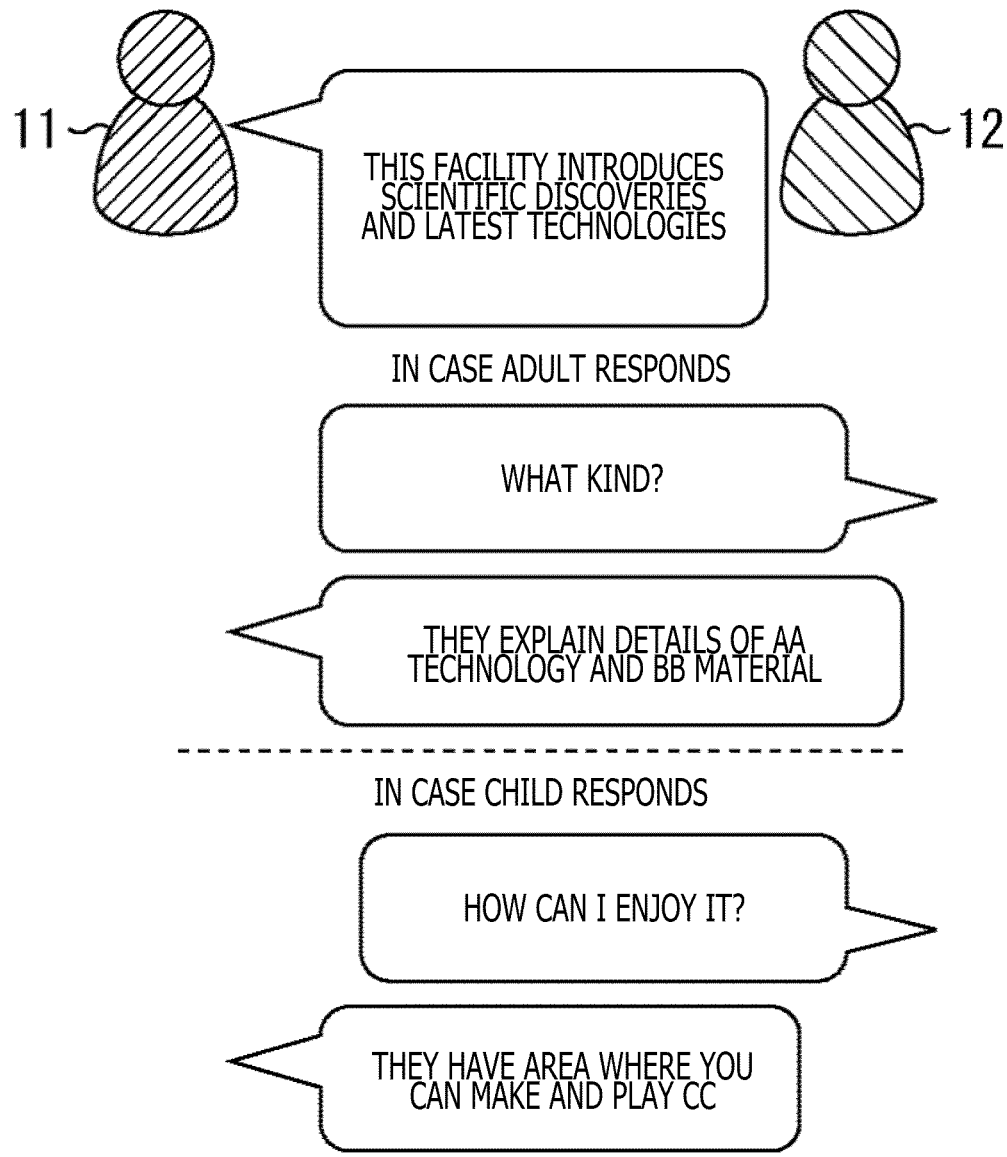
FIG. 13 is a diagram illustrating another example in which the signage apparatus dynamically changes a support presentation.

FIGS. 12 and 13 are diagrams illustrating examples in which the signage apparatus 50 illustrated in FIG. 11 dynamically changes information to be presented depending on whether or not there is a response from a user. Responses from a user include, for example, detected instances where the user approaches the screen, the user turns its face, and the user opens its eyes.

In the example illustrated in FIG. 12, the users 61 and 62 are not distinguished from each other, and it is detected whether or not there is a response therefrom. The presentation information "THIS FACILITY INTRODUCES SCIENTIFIC DISCOVERIES AND LATEST TECHNOLOGIES" as a voice of the main agent 11. If there is a user's response to the voice of the presentation information, then the support information "WHAT KINDS OF LATEST TECHNOLOGIES ARE THERE?" is output as a voice of the sub-agent 12, and the information "YOU CAN PLAY GAME WITH LATEST ROBOT" is output as a voice of the main agent 11.

Conversely, there is no response from the users 61 and 62, then the support information "ARE THERE ANY OTHER GIMMICKS?" is output as a voice of the sub-agent 12, and the information "ACTUALLY, SCIENTIFIC GOODS YOU CAN BUY AT SHOP ARE INTERESTING" is output as a voice of the main agent 11.

According to the example illustrated in FIG. 12, the support information is dynamically changed depending on whether there is a user's response or not, and the information uttered by the main agent 11 can be changed depending on the changed support information. Therefore, if there is a user's response, its information can be conveyed in detail, and if there is no user's response, other topics can be conveyed, and, as a result, it is expected to provide an effect of attracting the user's interest.

In the example illustrated in FIG. 13, the users 61 and 62 are distinguished from each other, and their attributes, i.e., an adult and a child in FIG. 13, are detected and it is also detected whether or not there is a response therefrom. The presentation information "THIS FACILITY INTRODUCES SCIENTIFIC DISCOVERIES AND LATEST TECHNOLOGIES" as a voice of the main agent 11. If there is a response from the adult user 61 to the voice of the presentation information, then the support information "WHAT KIND?" for adults is output as a voice of the sub-agent 12, and the information "THEY EXPLAIN DETAILS OF AA TECHNOLOGY AND BB MATERIAL" for adults is output as a voice of the main agent 11.

If there is a response from the child user 62, the support information "HOW CAN I ENJOY IT?" for children is output as a voice of the sub-agent 12, and the information "THEY HAVE AREA WHERE YOU CAN MAKE AND PLAY CC" for children is output as a voice of the main agent 11.

According to the example illustrated in FIG. 13, the attributes of the users, i.e., an adult and a child in FIG. 13, are distinguished from each other, and it is detected whether or not there is a response from each of the users. The support information is dynamically changed if there is a response from the adult user 61 and if there is a response from the child user 62, and the information uttered by the main agent 11 is changed depending on the changed support information. Consequently, in the event that users having different attributes exist at the same time, it is expected to provide an effect of attracting both user's interests.

Although not illustrated, it is also possible to dynamically change the support information if there is no response from the adult user 61 and if there is no response from the child user 62, and to change the information uttered by the main agent 11 depending on the changed support information.

<Application to a Car Navigation Apparatus>

Figure 14:
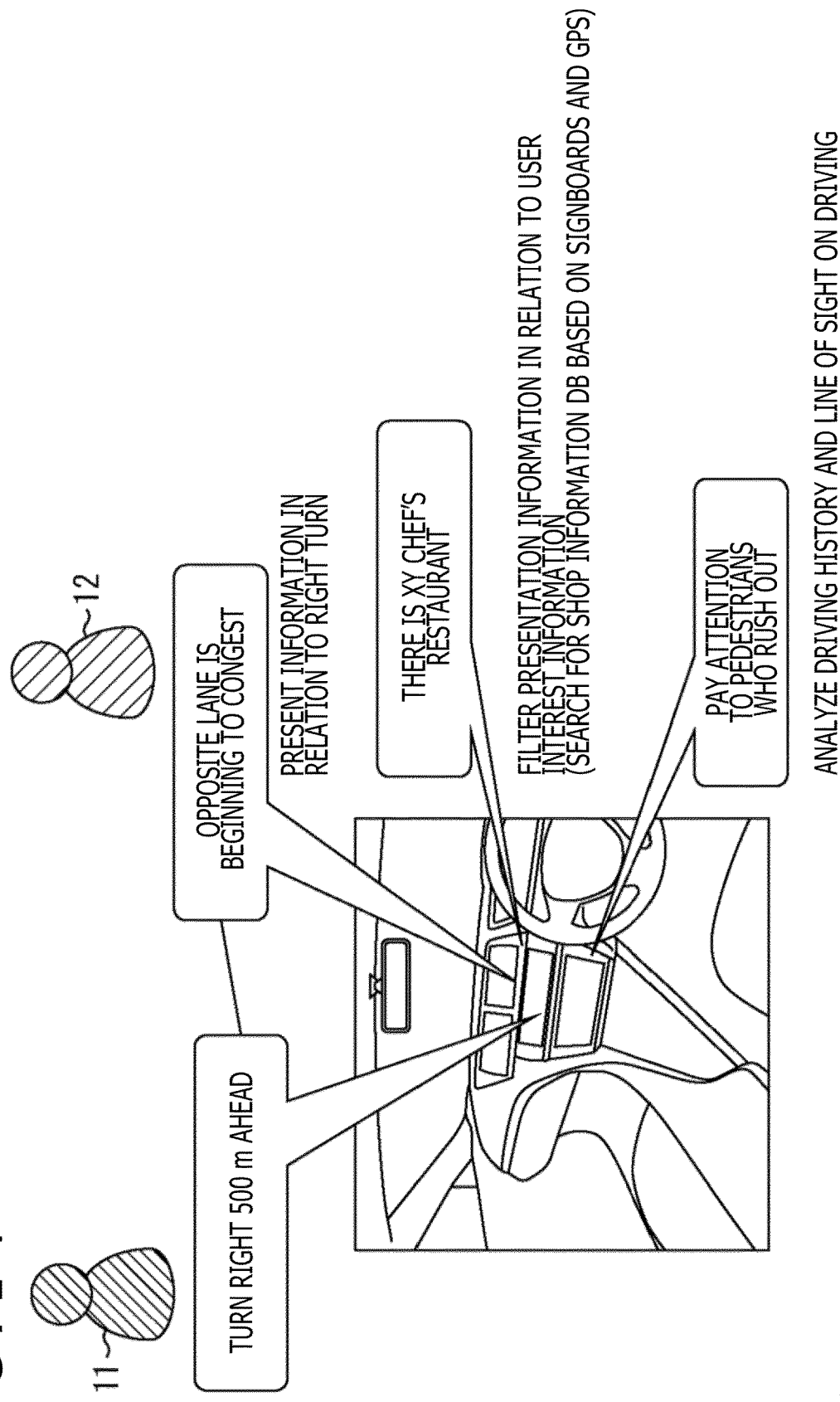
FIG. 14 is a diagram illustrating an example of support information where the information presenting apparatus is applied to a car navigation apparatus.

FIG. 14 is a diagram illustrating an example of support information where the information presenting apparatus 20 is applied to a car navigation apparatus.

In the example illustrated in FIG. 14, the presentation information "TURN RIGHT 500 m AHEAD" is output as a voice of the main agent 11. It becomes clear that a right turn will be made soon after the presentation information, and the support information "OPPOSITE LANE IS BEGINNING TO CONGEST" is output as a voice of the sub-agent 12 for assisting in making the right turn. In addition, "THERE IS XY CHEF'S RESTAURANT" may be output as support information to introduce a nearby facility, and "PAY ATTENTION TO PEDESTRIANS WHO RUSH OUT" may be output as a heads-up. The introduction of a nearby facility may be realized by an information search based on positional information from GPS and signboards in a captured image outside of the car, for example. The heads-up may be realized by the results of an analysis of the driving history of the user or driver and the line of sight thereof on driving, and an analysis of a captured image outside of the car.

Figure 15:
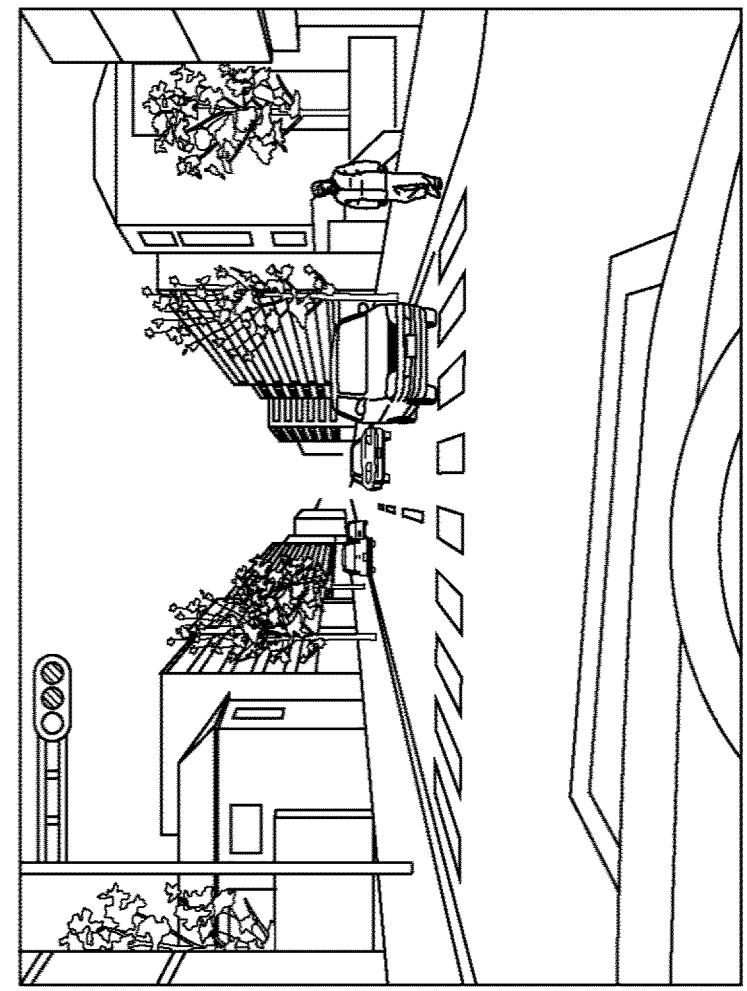
FIG. 15 is a diagram for explaining VQA technology.

Note that support information may be generated based on a document that is generated by applying VQA technology to a video image illustrated in FIG. 15, for example, that is captured of a scene outside of a vehicle incorporating a car navigation apparatus. The VQA technology refers to a technology for detecting subjects included in a video image and generating an explanatory document that explains the detected subjects.

FIG. 15 illustrates an example of a video image that is captured of a scene outside of a vehicle. The video image includes a pedestrian crossing, an opposite lane, oncoming cars, a traffic signal, a pedestrian, a signboard, houses, etc. In a case where the VQA technology is applied to the video image, it generates a document stating that "A horizontal pedestrian crossing exists substantially centrally in the vertical directions in the screen. There is a pedestrian on the right side of the pedestrian crossing, who seems to walk across the pedestrian crossing. A traffic signal exists above the pedestrian crossing and is lit green. An opposite lane exists slightly on the right side of the center in the horizontal directions in the screen, and oncoming cars are coming up on the opposite lane. There is a signboard on the left side in the screen, toward which the pedestrian crossing is directed. Houses exist on the right side in the screen, over the pedestrian." Using this document, it is possible to monitor the volume of traffic on the lane on which the vehicle travels and the opposite lane, and to predict that a pedestrian will walk across the pedestrian crossing, for example. Therefore, it is possible to output as a voice support information that is effective for the user or driver.

<Application to a Watch-Over System>

FIG. 16 illustrates an example of support information in an application in which the information presenting apparatus 20 is applied to a remote family watch-over system. The remote family refers to a child who is staying at home, an elderly person who lives alone, or the like.

In the example illustrated in FIG. 16, the presentation information "I WOKE UP AT 6 AM TODAY, . . . " uttered by the main agent 11 is analyzed, and the support information "YOU SEEM TO HAVE BEEN MORE RELAXED THAN USUAL" including an emotional word is generated depending on the result of the analysis and output as a voice of the sub-agent 12.

Note that the presentation information uttered by the main agent 11 is produced based on a document that is generated by applyng the VQA technology to a video captured of the house of the remote family.

Figure 17:
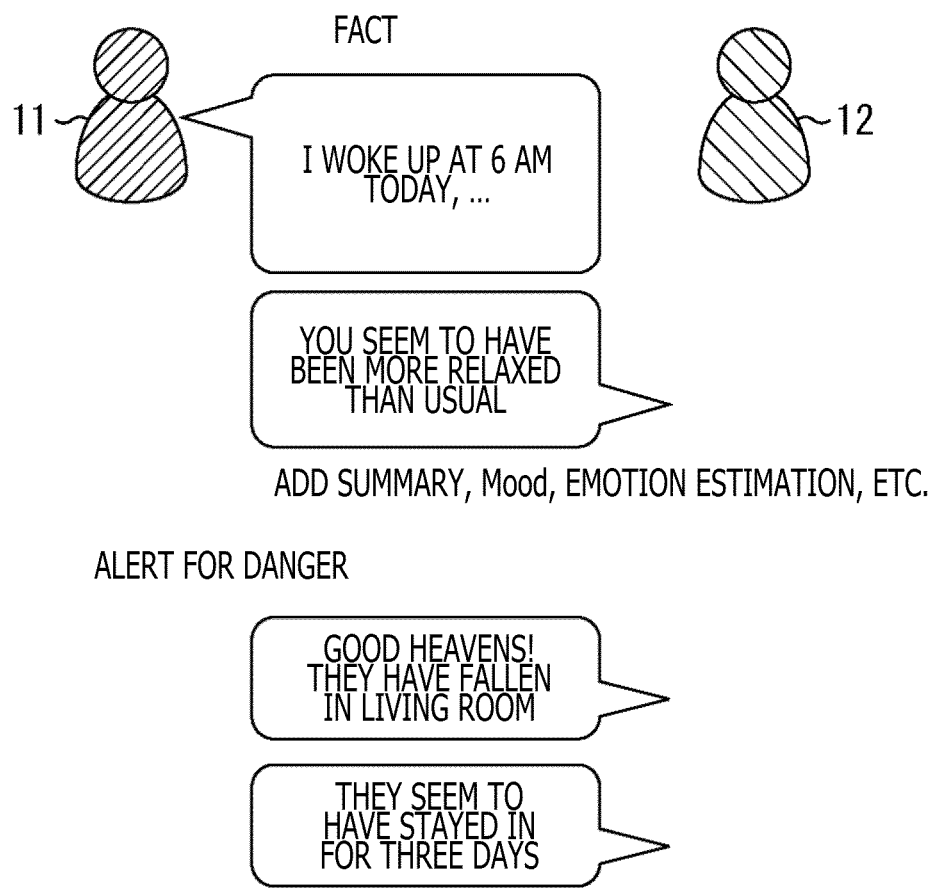
FIG. 17 is a diagram illustrating an example of video image captured of a house of a remote family.

FIG. 17 illustrates an example of video image captured of the house of the remote family. When a video image of the entrance to a living room is captured, as illustrated in A of FIG. 17, and analyed or the VQA technology is applied to the captured video image, the number of entries into and exists out of the living room can be recorded. When a video image of a kitchen is captured, as illustrated in B of FIG. 17, and analyzed or the VQA technology is applied to the captured video image, a cooking time zone can be recorded. When a video image of a living room is captured, as illustrated in C of FIG. 17, and analyzed or the VQA technology is applied to the captured video image, a time stayed on a sofa can be recorded. Furthermore, when any one of the video images is analyzed or the VQA technology is applied to the captured video image, the remote family can be monitored for a dangerous situation such as a falling down.

If a dangerous situation is detected from a video image captured of the house of the remote family, then support information is produced based on a document generated by applying the VQA technology to the video image, and "GOOD HEAVENS! THEY HAVE FALLEN IN LIVING ROOM," "THEY SEEM TO HAVE STAYED IN FOR THREE DAYS," or the like is output as a voice of the sub-agent 12.

As described above, the information presenting apparatus 20 that is applied to the remote family watch-over system allows the user to know easily how the remote family is doing with a voice during normal times. In the event of an abnormal situation, the user is able to know specific contents of the abnormal situation with a voice.

<Application to a Moving-Image Teaching Material>

Figure 18:
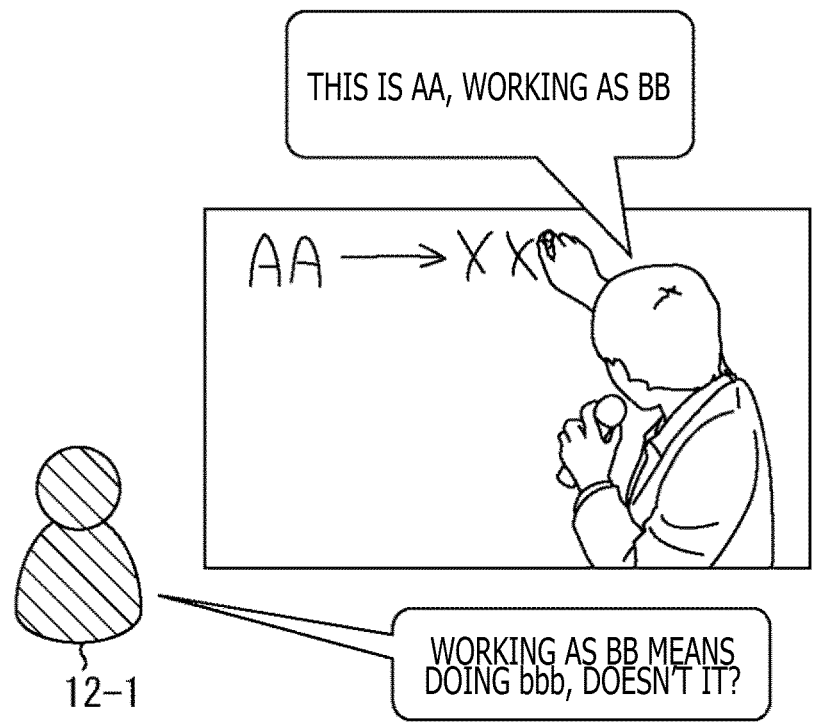
FIG. 18 is a diagram illustrating an example of support information where the information presenting apparatus is applied to an apparatus for reproducing a moving-image teaching material.
Figure 19:
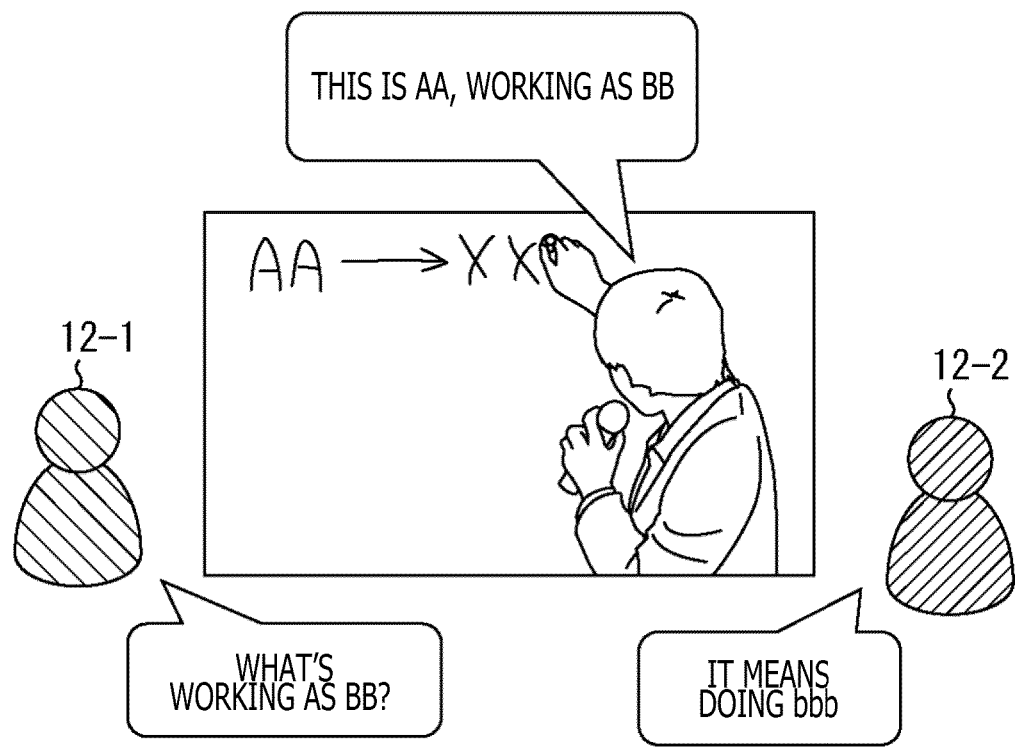
FIG. 19 is a diagram illustrating another example of support information where the information presenting apparatus is applied to an apparatus for reproducing a moving-image teaching material.

FIGS. 18 and 19 illustrate examples of support information in an application where the information presenting apparatus 20 is applied to an apparatus for reproducing a moving-image teaching material.

In the example illustrated in FIG. 18, the main agent 11 does not enter the scene, but the sub-agent 12 enters the scene as a single figure. However, the sub-agent 12 may be displayed on the screen or may not. The explanation "THIS IS AA, WORKING AS BB" spoken by a person actually appearing in a moving image, i.e., a lecturer who gives a lecture in the example, is presented as presentation information and analyzed. Words that the user may think questionable, i.e., "WORKING AS BB," in this case are extracted depending on the result of the analysis, and the support information "WORKING AS BB MEANS DOING bbb, DOESN'T IT?" for explaining the extracted words is produced and output as a voice of the sub-agent 12.

Note that words that the user may think questionable may not only be extracted from the result of an analysis of the presentation information, but also be collected in advance from a history of questions in the past about the lecture. In the latter case, support information for explaining words that the user may think questionable may also be produced in advance. Furthermore, words that the user may think questionable may be collected in real time.

According to the example illustrated in FIG. 18, since the sub-agent 12 explains questionable words even if the user does not ask about them, it is expected to provide an effect of deepening their understanding of the contents of the lecture.

In the example illustrated in FIG. 19, the main agent 11 does not enter the scene, but the sub-agent enters the scene as two figures 12-1 and 12-2. The sub-agents 12-1 and 12-2 may be displayed on the screen or may not. The main agent 11 does not enter the scene, and the explanation "THIS IS AA, WORKING AS BB" spoken by a person actually appearing in a moving image, i.e., a lecturer who gives a lecture in the example, is presented as presentation information and analyzed. Words that the user may think questionable, i.e., "WORKING AS BB," in this case are extracted depending on the result of the analysis, and the support information "WHAT'S WORKING AS BB?" of a question including the extracted words is output as a voice of the sub-agent 12-1. Moreover, the support information "IT MEANS DOING bbb" for explaining the extracted words is output as a voice of the sub-agent 12-2.

As is the case with the example illustrated in FIG. 18, words that the user may think questionable may be collected in advance from a history of questions in the past about the lecture, for example. In this case, support information for explaining words that the user may think questionable may also be produced in advance. Furthermore, words that the user may think questionable may be collected in real time.

According to the example illustrated in FIG. 19, since the sub-agent 12-1 asks about questionable words even if the user does not ask about them and the sub-agent 12-2 explains them, it is expected to provide an effect of deepening the user's understanding of the contents of the lecture.

<Software Implementation of the above Sequence of Processes>

The above sequence of processes may be hardware-implemented or software-implemented. If the sequence of processes is software-implemented, then software programs are installed in a computer. The computer may include a computer assembled on dedicated hardware or a general-purpose personal computer, for example, capable of performing various functions.

FIG. 20 is a diagram illustrating a configurational example of the hardware of a computer that executes the above sequence of processes performed by the above information presenting apparatus 20, based on programs.

The computer includes a CPU (Central Processing Unit) 101, a ROM (Read Only Memory) 102, and a RAM (Random Access Memory) 103 that are connected to each other by a bus 104.

An input/output interface 105 is connected to the bus 104. To the input/output interface 105, there are connected an input unit 106, an output unit 107, a storage unit 108, a communication unit 109, and a drive 110.

The input unit 106 includes a keyboard, a mouse, and a microphone, etc. The output unit 107 includes a display and a speaker, etc. The storage unit 108 includes a hard disk and a non-volatile memory, etc. The communication unit 109 includes a network interface, etc. The drive 110 drives a removable medium 111 such as a magnetic disk, an optical disk, a magneto-optical disk, a semiconductor memory, or the like.

In the computer 100 thus constructed, the CPU 101 loads programs stored in the storage unit 108, for example, through the input/output interface 105 and the bus 104 into the RAM 103 and executes the programs to perform the processes described above.

The programs run by the computer 100 (the CPU 101) can be recorded on and provided by the removable medium 211 as a package medium or the like, for example. The programs can also be provided through a wired or wireless transmission medium such as a local area network, the Internet, or a digital satellite broadcast.

Note that the programs run by the computer 100 may be programs that are executed in chronological order in the order described above in the present description, or may be programs executed parallel to each other or at necessary times such as when called up.

Note that embodiments of the present technology are not limited to the above embodiment, and various changes may be made therein without departing from the scope of the present technology.

The present technology may have the following configurations:

(1)

An information presenting apparatus including:

an acquirer that acquires presentation information to be presented to a user;

a generator that generates support information to be presented, together with the presentation information, to the user, based on the acquired presentation information, and synthesizes a voice that corresponds to the generated support information; and a presenter that presents the synthesized voice that corresponds to the support information, as an utterance of a first agent.

(2)

The information presenting apparatus according to (1), in which the presenter outputs the synthesized voice that corresponds to the support information as the utterance of the first agent by displaying a character image of the first agent.

(3)

The information presenting apparatus according to (1) or (2), in which the generator further synthesizes a voice that corresponds to the presentation information; and the presenter further outputs the synthesized voice that corresponds to the presentation information as an utterance of a second agent.

(4)

The information presenting apparatus according to (3), in which the presenter outputs the synthesized voice that corresponds to the presentation information as the utterance of the second agent by displaying a character image of the second agent.

(5)

The information presenting apparatus according to any one of (1) through (4), further including:

an analyzer that analyzes the acquired presentation information, in which the generator generates the support information based on a result of the analysis of the presentation information.

(6)

The information presenting apparatus according to any one of (1) through (5), further including:

a detector that detects a state of the user, in which the presenter outputs the synthesized voice that corresponds to the support information as the utterance of the first agent depending on the detected state of the user.

(7)

The information presenting apparatus according to (6), in which the detector further detects an attribute of the user; and the presenter outputs the synthesized voice that corresponds to the support information as the utterance of the first agent depending on the detected attribute of the user.

(8)

The information presenting apparatus according to any one of (1) through (7), in which the generator generates the support information that includes an emotional word regarding the presentation information.

(9)

The information presenting apparatus according to any one of (1) through (7), in which the generator generates the support information that includes an essential point of the presentation information.

(10)

The information presenting apparatus according to any one of (1) through (7), in which the generator generates the support information that includes a question regarding contents of the presentation information.

(11)

The information presenting apparatus according to any one of (1) through (7), in which the generator generates the support information that includes user information related to the presentation information.

(12)

The information presenting apparatus according to any one of (1) through (7), in which the generator generates the support information based on an explanatory document that explains a video image related to the presentation information.

(13)

The information presenting apparatus according to any one of (3) through (12), in which the generator generates response information to be presented as an utterance of a response of the second agent to the support information to be presented as the utterance of the first agent, and synthesizes a voice that corresponds to the response information; and the presenter further outputs the synthesized voice that corresponds to the response information as the utterance of the second agent.

(14)

The information presenting apparatus according to any one of (3) through (12), in which the generator generates response information to be presented as an utterance of a response of the second agent to an utterance of the user with respect to the presentation information presented as the utterance of the second agent, and synthesizes a voice that corresponds to the response information; and the presenter further outputs the synthesized voice that corresponds to the response information as the utterance of the second agent.

(15)

An information presenting method to be carried out by an information presenting apparatus, including the steps, performed by the information presenting apparatus, of:

acquiring presentation information to be presented to a user;

generating support information to be presented, together with the presentation information, to the user, based on the acquired presentation information, and synthesizing a voice that corresponds to the generated support information; and presenting the synthesized voice that corresponds to the support information, as an utterance of a first agent.

REFERENCE SIGNS LIST

11 Main agent, 12 Sub-agent, 20 information presenting apparatus, 21 Presentation information acquirer, 22 Presentation information analyzer, 23 User DB, 24 Agent utterance controller, 25 Expression DB, 26 User state processor, 27 Display, 28 Speaker, 29 Microphone, 30 Sensor, 50 Signage apparatus, 100 Computer, 101 CPU

The invention claimed is:

1. An information presenting apparatus comprising:
an acquirer that acquires presentation information to be presented to a user on a display;
a generator that generates support information to be presented, together with the acquired presentation information, to the user, based on the acquired presentation information, and synthesizes a voice that corresponds to the generated support information; and
a presenter that presents the synthesized voice to the user as an utterance of a first agent,
wherein the synthesized voice corresponds to the generated support information, and
wherein the first agent is displayed on the display based on contents of the acquired presentation information and the generated support information.

2. The information presenting apparatus according to claim 1, wherein the presenter outputs the synthesized voice that corresponds to the support information as the utterance of the first agent by displaying a character image of the first agent.

3. The information presenting apparatus according to claim 2, wherein
the generator further synthesizes a voice that corresponds to the presentation information; and
the presenter further outputs the synthesized voice that corresponds to the presentation information as an utterance of a second agent.

4. The information presenting apparatus according to claim 3, wherein the presenter outputs the synthesized voice that corresponds to the presentation information as the utterance of the second agent by displaying a character image of the second agent.

5. The information presenting apparatus according to claim 3, wherein
the generator generates response information to be presented as an utterance of a response of the second agent to the support information to be presented as the utterance of the first agent, and synthesizes a voice that corresponds to the response information; and
the presenter further outputs the synthesized voice that corresponds to the response information as the utterance of the second agent.

6. The information presenting apparatus according to claim 3, wherein
the generator generates response information to be presented as an utterance of a response of the second agent to an utterance of the user with respect to the presentation information presented as the utterance of the second agent, and synthesizes a voice that corresponds to the response information; and
the presenter further outputs the synthesized voice that corresponds to the response information as the utterance of the second agent.

7. The information presenting apparatus according to claim 2, further comprising:
an analyzer that analyzes the acquired presentation information,
wherein the generator generates the support information based on a result of the analysis of the presentation information.

8. The information presenting apparatus according to claim 2, further comprising:
a detector that detects a state of the user,
wherein the presenter outputs the synthesized voice that corresponds to the support information as the utterance of the first agent depending on the detected state of the user.

9. The information presenting apparatus according to claim 6, wherein
the detector further detects an attribute of the user; and
the presenter outputs the synthesized voice that corresponds to the support information as the utterance of the first agent depending on the detected attribute of the user.

10. The information presenting apparatus according to claim 2, wherein the generator generates the support information that includes an emotional word regarding the presentation information.

11. The information presenting apparatus according to claim 2, wherein the generator generates the support information that includes an essential point of the presentation information.

12. The information presenting apparatus according to claim 2, wherein the generator generates the support information that includes a question regarding the contents of the presentation information.

13. The information presenting apparatus according to claim 2, wherein the generator generates the support information that includes user information related to the presentation information.

14. The information presenting apparatus according to claim 2, wherein the generator generates the support information based on an explanatory document that explains a video image related to the presentation information.

15. An information presenting method to be carried out by an information presenting apparatus, the method comprising:
acquiring presentation information to be presented to a user on a display;
generating support information to be presented, together with the acquired presentation information, to the user, based on the acquired presentation information, and synthesizing a voice that corresponds to the generated support information; and
presenting the synthesized voice to the user as an utterance of a first agent,
wherein the synthesized voice corresponds to the generated support information, and
wherein the first agent is displayed on the display based on contents of the acquired presentation information and the generated support information.

* * * * *